(12) United States Patent
Steely, Jr.

(10) Patent No.: US 7,237,067 B2
(45) Date of Patent: Jun. 26, 2007

(54) MANAGING A MULTI-WAY ASSOCIATIVE CACHE

(75) Inventor: Simon C. Steely, Jr., Hudson, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 317 days.

(21) Appl. No.: 10/829,186

(22) Filed: Apr. 22, 2004

(65) Prior Publication Data

US 2005/0240731 A1    Oct. 27, 2005

(51) Int. Cl.
*G06F 12/00* (2006.01)

(52) U.S. Cl. .................. 711/133; 711/118; 711/128; 711/134; 711/135; 711/136; 365/49; 365/50

(58) Field of Classification Search ............ 711/128, 711/133, 118, 134, 135, 136; 365/49, 50
See application file for complete search history.

(56) References Cited

U.S. PATENT DOCUMENTS

| | | | |
|---|---|---|---|
| 5,367,653 A * | 11/1994 | Coyle et al. ................. | 711/128 |
| 5,497,477 A * | 3/1996 | Trull ........................... | 711/133 |
| 5,778,427 A * | 7/1998 | Hagersten et al. .......... | 711/128 |
| 6,105,115 A | 8/2000 | Mathews et al. | |
| 6,134,636 A | 10/2000 | Mathews et al. | |
| 6,275,919 B1 * | 8/2001 | Johnson ....................... | 711/216 |
| 6,405,287 B1 | 6/2002 | Lesarte | |
| 6,438,657 B1 | 8/2002 | Gilda | |
| 6,490,656 B1 | 12/2002 | Carlson | |
| 6,542,966 B1 | 4/2003 | Crawford et al. | |
| 6,560,676 B1 | 5/2003 | Nishimoto et al. | |
| 6,594,742 B1 | 7/2003 | Ezra | |
| 6,687,793 B1 | 2/2004 | Thomas et al. | |
| 6,694,408 B1 | 2/2004 | Villagomez et al. | |
| 6,745,291 B1 * | 6/2004 | York ........................... | 711/128 |
| 6,748,492 B1 * | 6/2004 | Rowlands et al. ........... | 711/128 |
| 2002/0138648 A1 * | 9/2002 | Liu ............................. | 709/245 |
| 2003/0204664 A1 * | 10/2003 | Bennett ......................... | 711/3 |
| 2004/0078524 A1 * | 4/2004 | Robinson ..................... | 711/133 |
| 2004/0153607 A1 * | 8/2004 | Rowlands et al. ........... | 711/118 |

* cited by examiner

*Primary Examiner*—Stephen C. Elmore
*Assistant Examiner*—Daniel Kim

(57) ABSTRACT

Methods for storing replacement data in a multi-way associative cache are disclosed. One method comprises logically dividing the cache's cache sets into segments of at least one cache way; searching a cache set in accordance with a segment search sequence for a segment currently comprising a way which has not yet been accessed during a current cycle of the segment search sequence; searching the current segment in accordance with a way search sequence for a way which has not yet been accessed during a current way search cycle; and storing the replacement data in a first way which has not yet been accessed during a current cycle of the way search sequence. A cache controller that performs such methods is also disclosed.

26 Claims, 6 Drawing Sheets

MANAGING A MULTI-WAY ASSOCIATIVE CACHE

BACKGROUND

1. Field of the Invention

The present invention relates generally to cache memory systems and, more particularly, to managing multi-way associative caches.

2. Related Art

Most computer systems include, among other components, a processor and a memory device. The speed at which the processor can execute instructions and process data depends on the rate at which the instructions and data can be transferred from memory to the processor. In an attempt to reduce the time required for the processor to obtain instructions and data, computer architectures commonly include a memory hierarchy, with smaller, faster memory devices located more proximate to the processor than larger, slower memory devices. Typically, memory hierarchies include a cache memory physically and logically located between the processor and a larger main memory device.

A cache memory is a small, high-speed buffer memory which is used to temporarily hold the contents of main memory which are likely be used in the near future by the processor. Because cache memory typically has access times which are several times faster than those of main memory, the use of cache memory can significantly improve system performance by reducing the time a processor waits for instructions and data to be fetched from and/or stored to memory.

A cache memory comprises many lines of data, commonly referred to as cache entries, which have been copied from the computer system's main memory. Associated with each cache entry is a cache tag. A cache entry's tag provides information for mapping the cache entry's data to its main memory address. Each time a processor requests an instruction or data from memory, a tag comparison is made to determine whether a copy of the requested data resides in the cache. If the desired data is not in the cache, the requested data is retrieved from the main memory, stored in the cache, and supplied to the processor. Commonly used mapping functions for cache data storage include direct mapping and associative mapping techniques.

In a multi-way associative cache, a single index is used to simultaneously access a plurality of cache entries. The collection of all cache entries addressed by a single cache index is referred to as a cache set. The number of cache entries addressed by a single cache index indicates the "way" number of a cache. For example, if in a cache a single cache index is used to access data from two data arrays, the cache is a 2-way associative cache. Similarly, if in a cache a single cache index is used to access data from four data arrays, the cache is a 4-way associative cache.

A multi-way cache access includes performing a tag comparison for each way. If a tag comparison indicates that the desired line of data resides in a particular way, the data line is output from the cache for subsequent use by the processor which requested the data. If the requested data is not stored in the cache, then the data is retrieved from main memory and stored in a way of the cache. Since there are a finite number of data lines in a cache, it is frequently necessary to replace the data stored in a cache as new data is needed. However, each time a new line of data is retrieved from main memory, a determination must be made as to which line of data in the cache is to be replaced. For a multi-way associative cache, this determination involves selecting the way in which the new line of data will be stored.

SUMMARY

In one embodiment of the invention, a method for storing replacement data in a multi-way associative cache is disclosed. The method comprises logically dividing the cache's cache sets into segments of at least one cache way; searching a cache set in accordance with a segment search sequence for a segment currently comprising a way which has not yet been accessed during a current cycle of the segment search sequence; searching the current segment in accordance with a way search sequence for a way which has not yet been accessed during a current way search cycle; and storing the replacement data in a first way which has not yet been accessed during a current cycle of the way search sequence.

In another embodiment of the invention, a method for managing a multi-associative cache is disclosed. The method comprises: logically dividing each cache set of the cache into segments each comprising at least one cache way; storing replacement data in an invalidated way, if any, in the cache set, in response to a cache miss, and setting, in response to a processor accessing the replacement data, a way access indicator corresponding to the accessed way to a value indicating the way has been accessed; and selecting, when no invalidated way is in the cache set, a current segment of a segment search sequence for an available way; and searching the current segment in accordance with a way search sequence, for a next way not yet accessed during a current cycle of the way search sequence.

In a further embodiment of the invention, a processing environment comprising a processor and a multi-way associative cache is disclosed. The processing environment also comprises a cache controller configured to logically divide the cache's sets into segments of at least one cache way, and comprising replacement logic that, in response to a cache miss, stores the replacement data in a way, if available, that contains invalidated data, and if not available, searches a cache set in accordance with a segment search sequence for a segment comprising a way which has not yet been accessed during a current cycle of the segment search sequence, and searches each segment in accordance with a way search sequence for a way which has not yet been accessed during a current way search cycle; and stores the replacement data in a first way which has not yet been accessed during a current cycle of the way search sequence.

DETAILED DESCRIPTION

Figure 1:
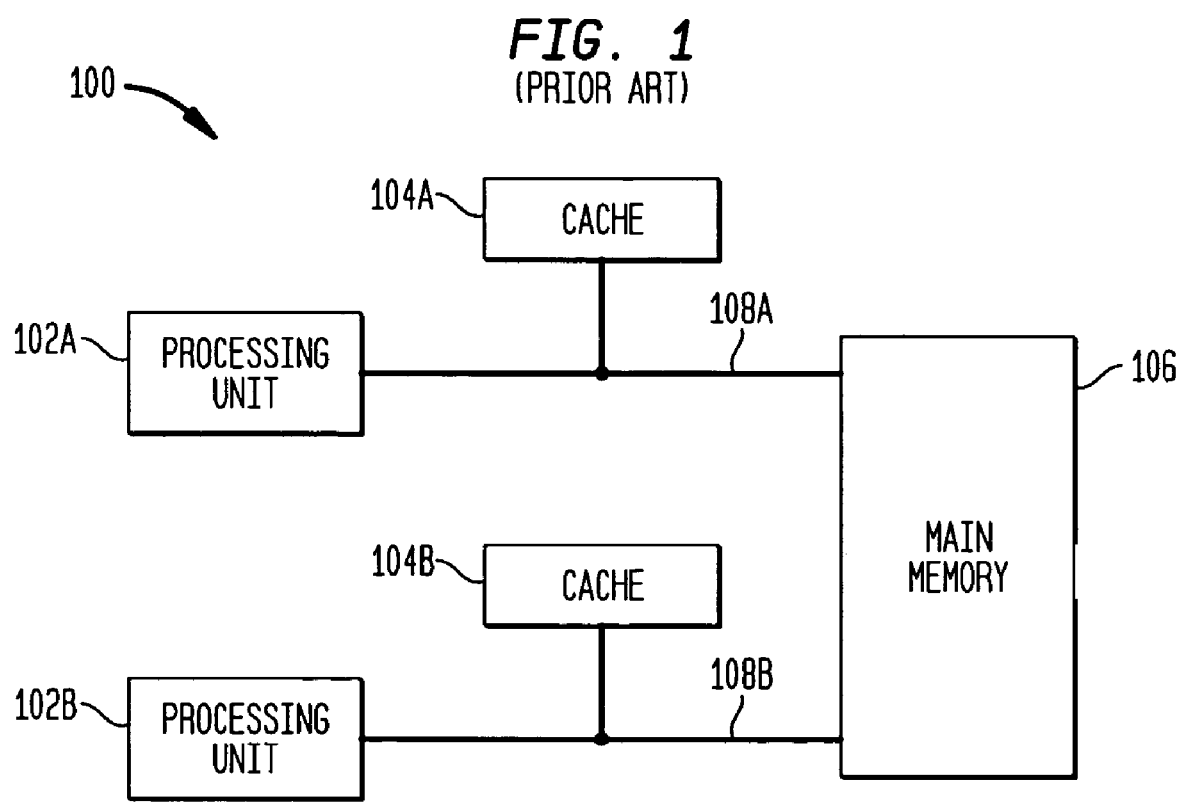
FIG. 1 is a block diagram of a computer system in which embodiments of the present invention can be implemented.

Embodiments of the present invention are directed to determining which way of a multi-way associative cache is to be filled with replacement data. Generally, embodiments of a cache system of the present invention logically divide each cache set of a multi-way associative cache into groups of ways, referred to herein as segments. When determining which way of the cache in which to store replacement data, replacement logic of the cache system sequentially searches segments of each cache set, and ways of each segment, according to predetermined search sequences. Each search sequence is repeatable and includes one reference for each searched entity (i.e., cache segment or way). A segment search cycle comprises the sequential consideration of all segments in a segment search sequence. Likewise, a way search cycle comprises the sequential consideration of all ways in a way search sequence. Preferably, the replacement logic does not advance through the search sequences to consider another segment or way until the segment and way currently being considered to receive replacement data is determined to be unavailable. The replacement logic maintains a way access indicator for each way in the cache. The way access indicator indicates whether its corresponding way is available for receiving replacement data. In one embodiment, this determination is based on whether the corresponding way has been accessed by the processor during a current way search cycle. Such access can occur either immediately upon a data request (i.e., a cache hit) or after replacement data is stored in the way (i.e., a cache miss).

More specifically, in one embodiment, the cache system implements a segment search sequence, with each segment being represented once in the sequence. For each cache set the replacement logic considers for replacement the same one segment (i.e., the same subset of ways) until all ways in that segment contain data that has recently been accessed by the processor. The replacement logic then selects for replacement consideration a next segment in the segment search sequence, relegating the completely accessed segment to the next search cycle in which the segment search sequence is repeated. Because the completely accessed segment will no longer be considered for replacement during the current search cycle, the corresponding way access indicators are reset (indicating the corresponding ways have not yet been accessed). Thereafter, new cache accesses are recorded by the way access indicators, and the segment will eventually once again become the current segment for replacement consideration in a new search cycle. This segmentation of cache sets, and the segment-sequential replacement scheme maximizes the utilization of historical cache activity while improving the efficiency with which entries in the multi-associative cache are replaced.

Further, within each segment, a predetermined search sequence is used to select which way in a segment is to store replacement data. As noted, a way access indicator is set when its corresponding cache entry has been accessed. The replacement logic steps through the way access indicators in accordance with a way search sequence and selects for replacement the first way which has not been accessed during the current search cycle; that is, the first way in the current segment that is available for storing replacement data. This causes a categorization of the data lines which are stored in the ways of each segment based on the frequency with which the data lines are utilized by the processor. That is, over time, data lines which are more often used by the processor migrate toward ways which are positioned later in the way search sequence while those data lines that are utilized less often migrate toward those ways having earlier positions in the way search sequence. This further increases the efficiency with which cache entries are replaced.

In addition, in certain embodiments the replacement logic first attempts to store the replacement data in an invalidated way of the current or all segments of a cache set prior to searching the current segment for an available way. Commonly, in multi-associative cache systems, cache ways are invalidated to maintain coherency between the caches and the main memory. Storing replacement data in an invalidated cache way results in the discarding of data which is the same as or older than, data stored in the corresponding address in main memory. In contrast, valid data that is replaced with replacement data may be requested by the processor, causing the data to once again be fetched from main memory and stored in the cache memory. Thus, it is preferential to store replacement data in a cache way that currently has invalid rather than valid data.

FIG. 1 is a high-level block diagram of an exemplary processing environment 100 in which embodiments of the present invention can be implemented. Processing environment 100 comprises a processor 102A, a cache 104A and a main memory 106, all of which are interconnected by a bus 108A. Under normal operations, processor 102A executes instructions and processes data stored in cache 104A until such time that cache 104A generates a cache miss. A cache miss occurs as a result of cache 104A not having in its store an instruction or data value which has been requested by processor 102A. In response to a cache miss, the missing instruction and data is typically retrieved from main memory 106, written into cache 104A, and then transmitted to processor 102A for subsequent execution or processing.

Similarly, a processor 102B and a cache 104B are connected to main memory 106 by a bus 108B. Processor 102B executes instructions and processes data stored in cache 104B until such time that cache 104B generates a cache miss. In response to a cache miss, the missing instruction and data is retrieved from main memory 106, written into cache 104B, and transmitted to the processor 102B for subsequent execution or processing.

Figure 2:
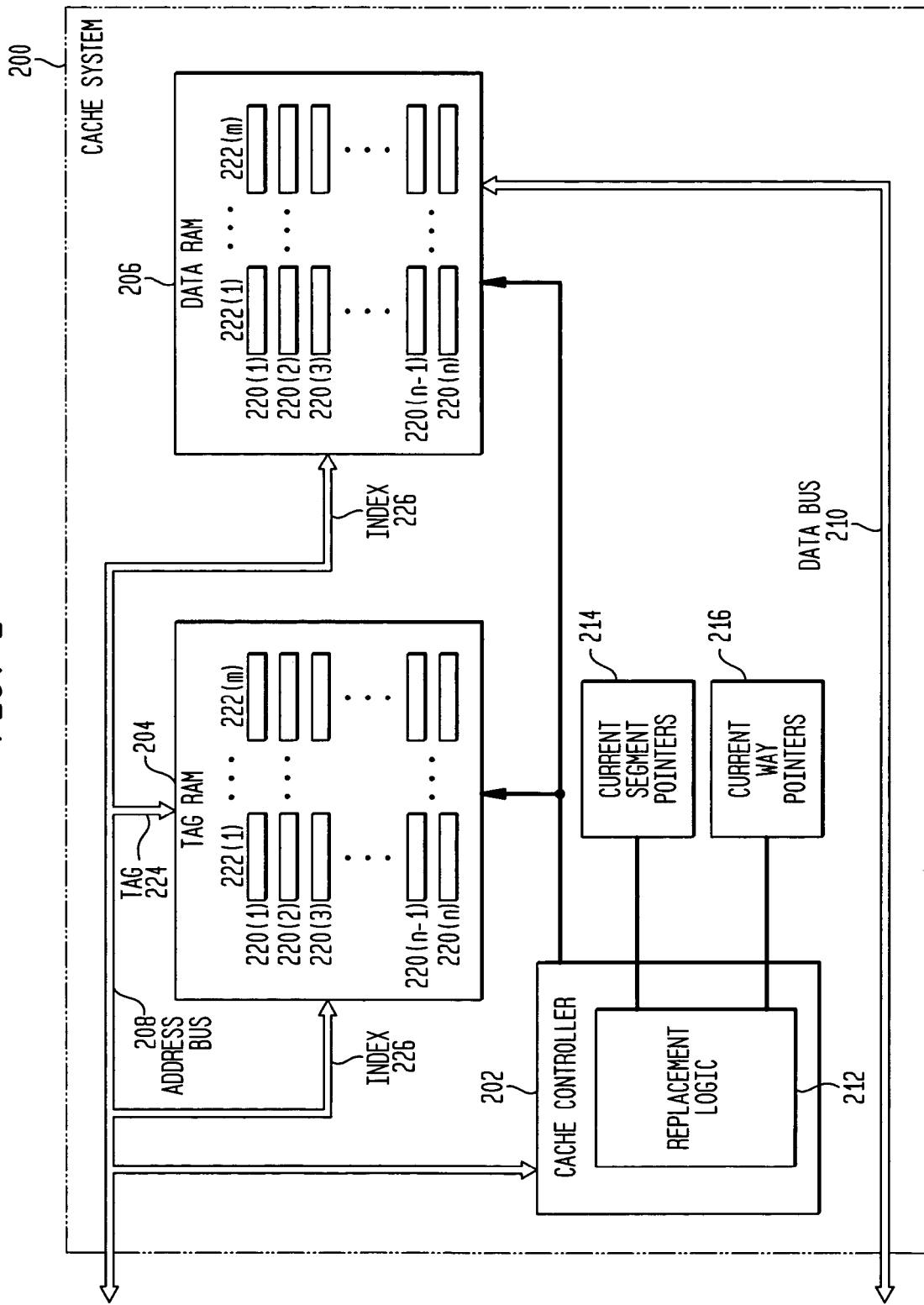
FIG. 2 is a block diagram of a cache system in accordance with one embodiment of the present invention.

FIG. 2 is a block diagram of a cache system 200 in accordance with one embodiment of the present invention. Cache system 200 comprises a cache controller 202, a tag RAM 204, a data RAM 206, an address bus 208, and a data bus 210. Cache controller 202 comprises replacement logic 212 that implements a cache way replacement policy in accordance with certain embodiments of the present invention.

In this exemplary embodiment, cache 200 is a multi-associative cache that can be implemented, for example, in the processing embodiment of FIG. 1. Multi-associative cache 200 has its memory area divided into blocks arranged in N rows and M columns. Each block stores data lines and its address, as described below. Each row in the cache is referred to as a set 220, while each column is referred to as a way 222. In particular, tag RAM 204 comprises tag data arranged in m-ways 222(*l*)-222(*m*) of n-sets 220(*l*)-220(*n*), and data RAM 206 comprises copies of cached data, also arranged in m-ways 222(*l*)-222(*n*) of n-sets 220(*l*)-220(*n*) with addresses corresponding to those of tag RAM 204.

In the multi-associative system, data fetched from main memory 106 is stored in one of the ways 222 in a set 220 uniquely determined by the address of the data; a data line in cache 200, therefore, may be identified by the cache set 220 and way 222 in which it is stored. A cache access is initiated by providing a cache index 226 to tag and data RAMs 204, 206, as shown in FIG. 2. Index 226 specifies a set 220 of cache 200, which includes m different ways 222(l)-222(m). Tag values stored in these m-ways 222 of tag RAM 204 are compared against the tag value 224 provided on address bus 208 to determine whether one of the data lines corresponds to the requested data. If so, the corresponding data is retrieved from data RAM 206 and provided on data bus 210.

As depicted in FIG. 2, this embodiment of replacement logic 212 maintains a current segment pointer 214 for each cache set 220 to identify which segment 402 in the cache set is the segment currently being considered for storing replacement data. Similarly, in certain embodiments replacement logic 212 maintains a current way pointer 216 for each cache set 220 to identify which way 222 in the current segment 402 is the way currently being considered for storing replacement data. However, in one embodiment, replacement logic 212 does not maintain a current way pointer 216. Rather, replacement logic 212 implements the same search sequence each time it searches a segment. The operations performed by replacement logic 212 which utilize pointers 214, 216 are described below.

Figure 3:
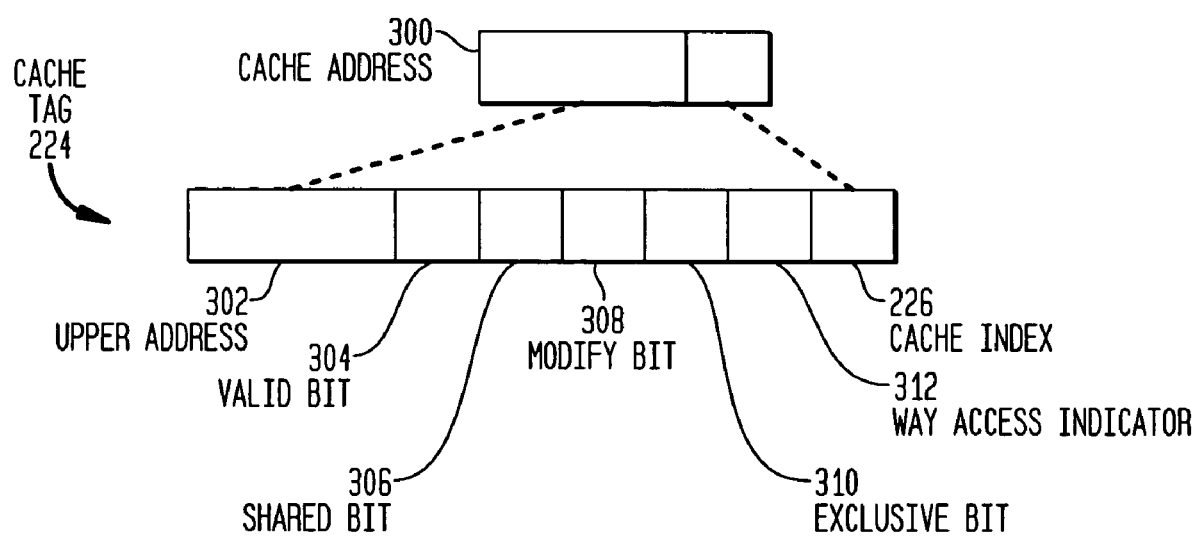
FIG. 3 is a block diagram of an exemplary cache address in accordance with one embodiment of the present invention.

FIG. 3 is block diagram of one embodiment of a cache tag 224. Cache tag 224 comprises upper address 302, state bits 304-312 and cache index 226. The concatenation of upper address 302 and cache index 226 forms cache address 300 of the corresponding data line. The state bits 304-312 are utilized to implement a cache coherency protocol and embodiments of the replacement scheme of the present invention. The state bits include a valid bit 304, a shared bit 306, a modify bit 308 an exclusive bit 310 and a way access indicator 312.

In multi-processor environments such as that illustrated in FIG. 1, either processor 102 can retrieve instructions and data from main memory 106, and store the retrieved instructions and data in its associated cache 104. To maintain the coherency of data stored in main memory 106, safeguards are taken to insure that the data stored in main memory 106 is not fetched by both processors 102A and 102B and then written back into main memory 106 such that one of those processors is not informed that the data stored in its cache 104 is not a true copy of the data currently stored in a corresponding main memory location. To prevent this, processor 102 generates an invalidate command which resets valid bit 304 associated with the ways 222 of caches 104 of other processors 102 in system 100 when the processor 102 alters a data line that is shared (as indicated by shared bit 306) by more than one processor.

Cache tag 224 also includes a way access indicator 312 that indicates whether the way 222 at cache address 300 is available for receiving replacement data. In one embodiment, this determination is based on whether the corresponding way 222 has been accessed by the processor during a current way search cycle, as described below. As noted, such access occurs when a cache hit as well as when a cache miss occurs.

Figure 4:
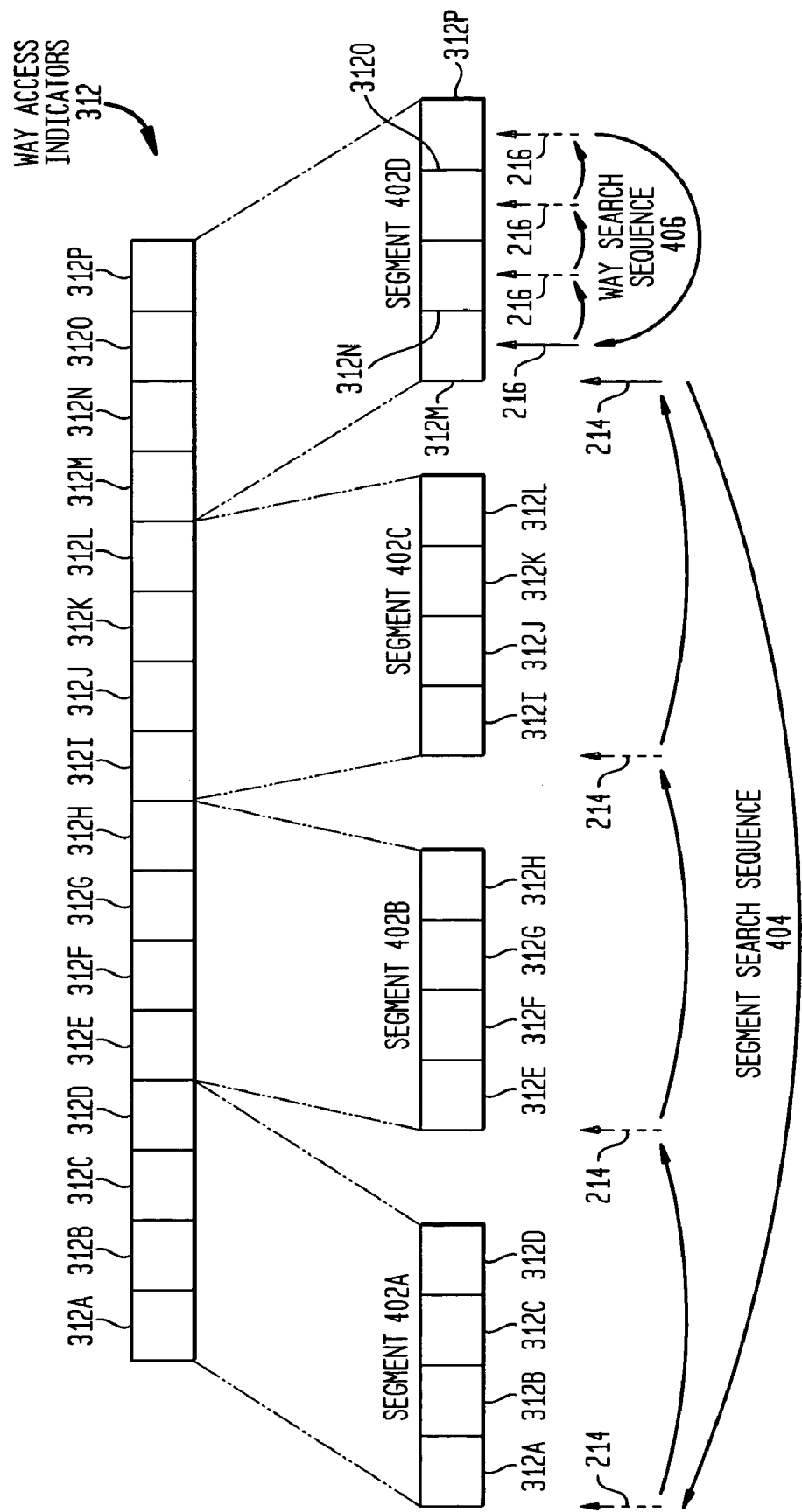
FIG. 4 is a schematic block diagram illustrating the division of an exemplary cache set into a plurality of segments, in accordance with one embodiment of the present invention.

As noted, embodiments of cache system 200 logically divide each cache set 220 into segments. FIG. 4 is a schematic block diagram illustrating the segmentation of an exemplary cache set 220. Depicted at the top of FIG. 4 are sixteen way access indicators 312A-312P, each corresponding to a way 222 in a cache set 220. In FIG. 4, the way access indicators 312A-312P corresponding to the sixteen ways 222 are shown arranged in a row for ease of illustration. Because this embodiment of the present invention monitors way access indicators 312, only the indicators are shown in FIG. 4. The remaining portions of their respective cache tag 224, and the corresponding ways 222, are not shown in FIG. 4.

In this illustrative example, the sixteen ways 222 are divided into four segments 402A-402D each comprising four ways 222. Specifically, segment 402A logically comprises ways 222(1)-222(4) having corresponding way access indicators 312A-312D; segment 402B logically comprises ways 222(5)-222(8) having corresponding way access indicators 312E-312H; segment 402C logically comprises ways 222(9)-222(12) having corresponding way access indicators 312I-312L; and segment 402D logically comprises ways 222(13)-222(16) having corresponding way access indicators 312M-312P. It should be appreciated that the ways could be logically divided to provide greater or fewer segments each having greater or fewer ways.

As noted, replacement logic 212 maintains current segment pointers 214 and, in certain embodiments, current way pointers 216 to identify which segment 402 and way 222 in a cache set 220 are currently being considered for storing replacement data. Replacement logic 212 sequentially searches segments of each cache set according to a predetermined segment search sequence. An exemplary search sequence is illustrated in FIG. 4. In this example, segment 402D is the current segment. As such, current segment pointer 214 which points to segment 402D is shown as a solid line while the current segment pointers 214 which point to segments 402A-402C are shown as dashed lines. In this four-segment example, a segment search sequence 404 comprises segments 402A, 402B, 402C and 402D, as represented by the sequence arrows. As shown in FIG. 4 and as noted above, search sequence 404 is repeatable and includes one reference for each segment 402A-402D. It should be appreciated that segment search sequence 404 is exemplary only and that segments 402 can have any relative position in a segment search sequence.

Similarly, a way search sequence 406 is also illustrated in FIG. 4. Because segment 402D is the current segment in this example, the exemplary way search sequence 406 is described in connection with segment 402D. Replacement logic 212 sequentially searches way access indicators 312M-213P of current segment 402D according to a predetermined way search sequence. In this four-way example, a way search sequence 406 comprises way access indicators 312M, 312N, 312O and 312P. Preferably, replacement logic 212 searches segment 402D by implementing the entire way search sequence 406. In an alternate embodiment, current way pointers 216 are maintained. In this example, way access indicator 312M is the current way. As such, current way pointer 216 which points to way access indicator 312M is shown as a solid line while the current way pointers 216 which point to way access indicators 312N-312P are shown as dashed lines. In either embodiment, the sequence in which ways 312M-312P are searched is represented by the arrows of way search sequence 406. As shown in FIG. 4 and as noted above, way search sequence 406 is repeatable and includes one reference for each way access indicator 312M-312P. It should be appreciated that way search sequence 406 is exemplary only and that ways 312 can have any relative position in a segment search sequence.

Figure 5:
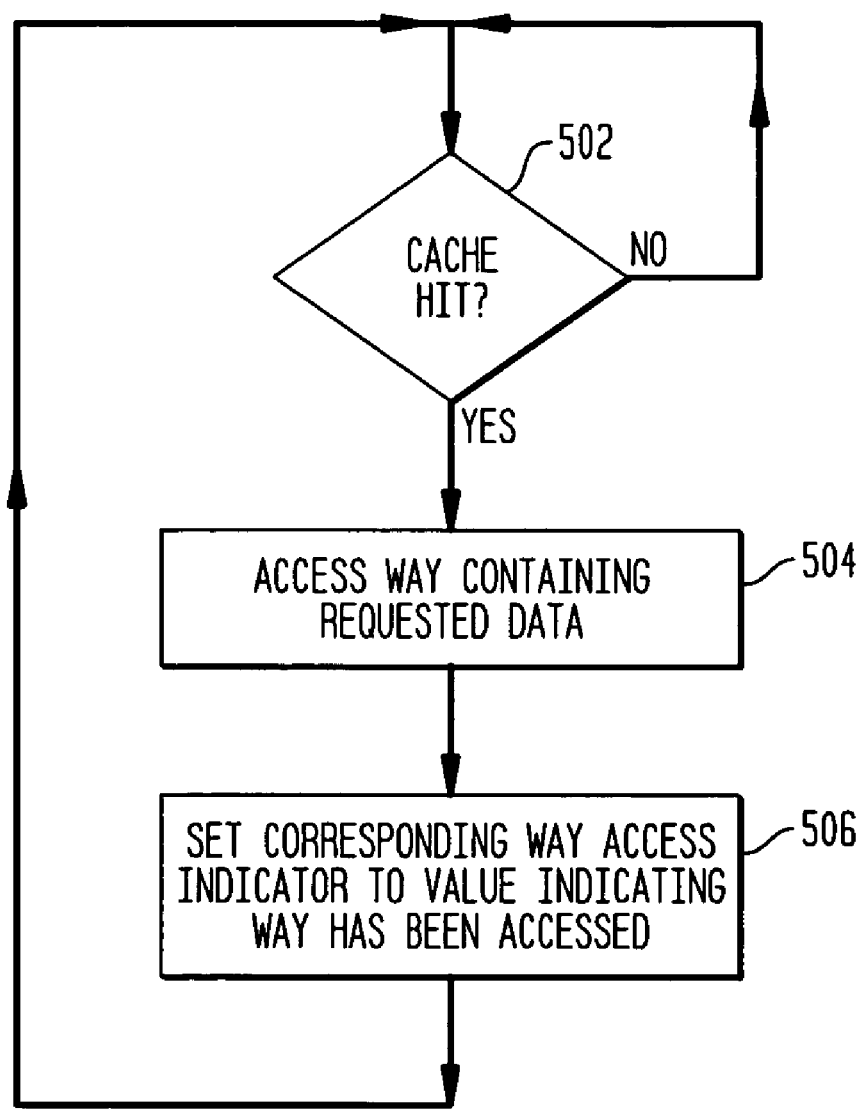
FIG. 5 is a flow chart of the operations performed by one embodiment of cache system of the present invention when the processor requests data that is located in the cache.

FIG. 5 is a flow chart of the operations performed by one embodiment of cache system 200 of the present invention when the processor requests data that is located in the cache. Such a cache access is commonly referred to as a cache hit. When a cache hit is detected at block 502, the way 222 associated with the requested data is accessed at block 504.

During access 504, the targeted data is read from or written to the hit cache way 222 according to whether the access is triggered by a load or store.

At block 506, the way access indicator 312 corresponding to the accessed way 222 is set to a value indicating the way was accessed by a processor 102. Processing control then returns to block 502 until another cache hit is detected.

Figure 6:
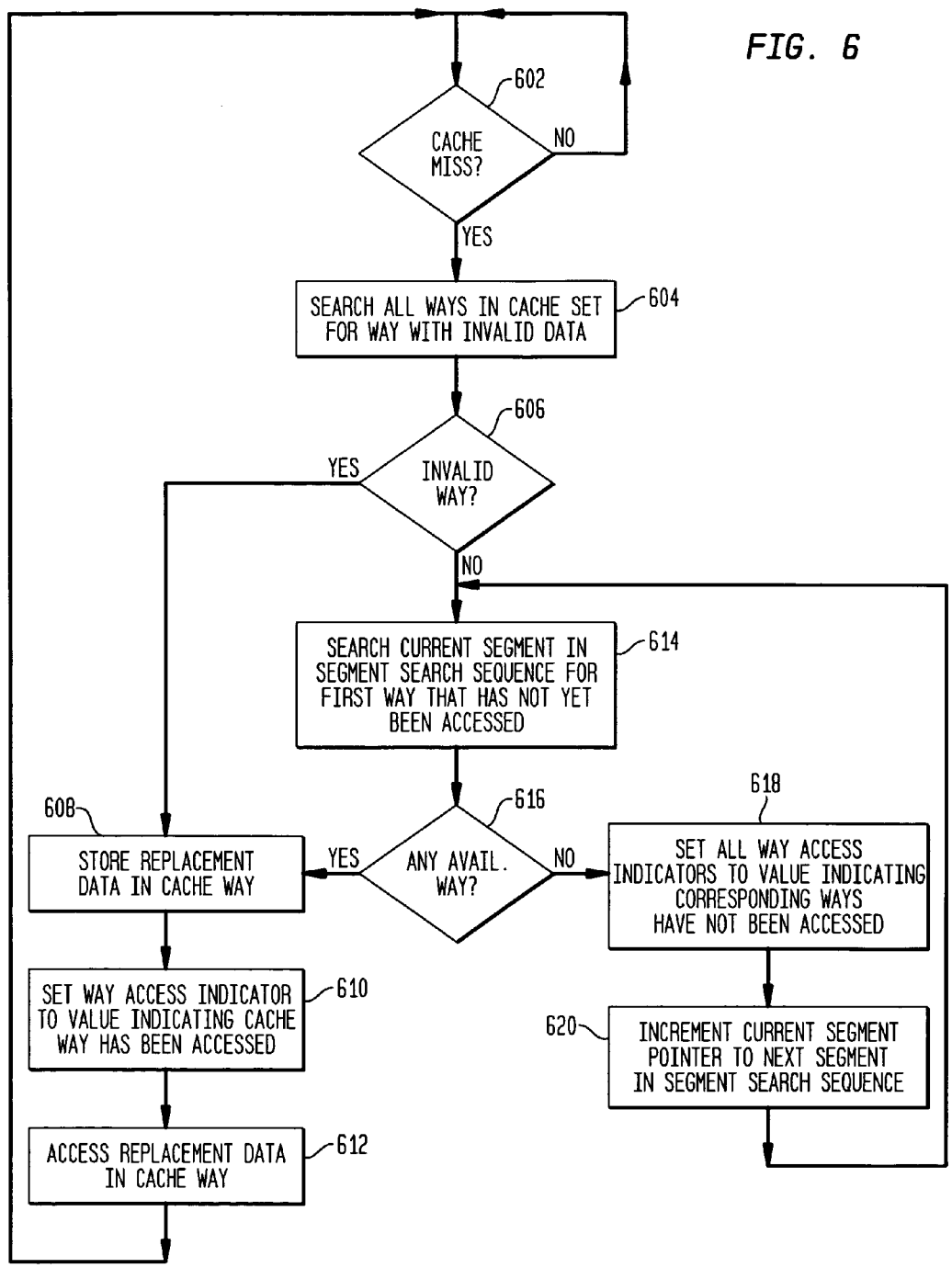
FIG. 6 is a flow chart of the operations performed by one embodiment of cache system when a processor requests data that is not located in the cache.

FIG. 6 is a flow chart of the operations performed by one embodiment of cache system 200 when a processor 102 requests data that is not located in cache 200, a condition commonly referred to as a cache miss. When at block 602 a cache miss is detected, the following operations beginning at block 604 are performed. Otherwise, cache miss operations of this embodiment of the present invention are not performed.

In one embodiment, replacement logic 212 first attempts to locate a way 222 with invalid data in which to store the replacement data. In the embodiment shown in FIG. 6, at block 604, replacement logic 212 searches all ways 222 in each cache set 220 for a way with invalid data. Referring to FIG. 3, this information is stored in valid bit 304 of cache tag 224, as described above. If valid bit 304 is set, then valid data is stored in the corresponding way 222; otherwise the way contains data that has been invalidated.

If a way 222 with invalid data is located at block 606, then processing proceeds to blocks 608-612 at which the following operations are performed. At block 608, the replacement data is stored in the located way 222, replacing the invalid data previously stored in that way. At block 610, the way access indicator 312 that corresponds to the accessed way is set to a value indicating that the way has been accessed, which occurs at block 612.

Returning to block 606, if no way 222 in the cache set 220 was identified as containing invalid data, operations advance to block 614. At block 614, replacement logic 212 searches the current segment 402 to determine whether there are any ways 222 in that segment that have not yet been accessed during the current search round. Replacement logic 212 searches the ways 222 in the current segment 402 in accordance with a predetermined search sequence such as way search sequence 406. Specifically, way access indicators 312 corresponding to the ways 222 in the current segment 402 are searched to determine if any of the corresponding ways 222 have not yet been accessed during the current way search cycle.

If at block 616, it is determined that at least one way 222 in the current segment 402 is available for replacement, then operations at blocks 608, 610 and 612 are performed to replace the data stored in the available way 222 with the replacement data. These operations are described above.

If at block 616 it is determined that all ways 222 in the current segment 402 have been accessed during the current way search sequence, then operations at blocks 618 and 620 are performed. These series of operations are performed to prepare the current, completely-accessed, segment 402 for use in a future segment search cycle, and to select a next segment 402 of ways 222 to consider for cache replacement.

At block 618, the way access indicators 312 for all ways 222 in the current segment 402 are set to indicate that they are available. Note that this operation effectively discards all historical information regarding cache accesses that has been gathered regarding this current segment.

At block 620, the current segment indicator 214 is incremented to select to a next segment 402 in the segment search sequence 404. Since the search sequence 404 is always maintained, and is repeatable, this operation effectively removes the current segment 402 from consideration for replacement data during the current search cycle.

Once the next segment 402 of the cache set 220 has been selected, the above operations beginning at block 614 are repeated for the new current segment 402. In an alternative embodiment, all ways 222 in the cache set 220 are searched immediately and collectively for one which is available when the current segment 402 is determined to be unavailable. This expedites the storage of the replacement data.

In an alternative embodiment, replacement logic 212 determines, prior to block 614, if all ways 222 in the cache set 220 have been accessed. If so, replacement logic 212 resets all cache way indicators 312, and proceeds to block 614. This avoids having to loop through blocks 614-620 to clear the way access indicators 312 of each segment 402 prior to selecting a way 222 in which to store replacement data.

It should be appreciated from this example that cache controller 202 does not perform any operations related to the implemented cache replacement scheme when addressing a cache hit condition. This provides embodiments of the present invention with the ability to take full advantage of invalidated ways. Resetting the way access indicators 312 for a current segment 402 which had its last available way 222 accessed with the cache hit prevents replacement logic 212 from storing data in any ways 222 in that segment 402 which have been invalidated between the time the cache hit occurred and the occurrence of the next cache miss. Thus, this provides certain embodiments of the present invention with the maximum opportunity to store replacement data in those ways that have been invalidated rather than having to search for and select a way that contains valid data. This not only improves the efficiency of replacement logic but reduces the risk that the data line that is replaced will once again be fetched from main memory to satisfy a future processor request.

As noted, the way access indicators 312 for a completely accessed segment are not cleared until the segment is no longer considered for replacement data during the current search cycle. This, in combination with the fact that operations related to the implemented cache replacement scheme are not performed in response to a cache hit, results in historical information being retained in the states of the way access indicators 312 for a maximum period of time. Waiting until replacement data is to be stored in the cache before resetting the way access indicators 312 for a completely accessed segment 402 enables embodiments of the present invention to utilize such historical cache access information when determining where to store the replacement data. This increases the likelihood that the data in a way 222 selected for storing replacement data is data that is less likely to be requested in the near future by the processor.

This retention of way access indicator states is further achieved by the logical division of each cache set 220 into separately-managed segments 402. When a complete segment 402 has been accessed during a current way search cycle, the historical cache access information for just that one segment 402 is lost. The cache access information for the remaining segments 402 in the cache set 220 is retained and utilized by replacement logic 212 to determine which way 222 in which to store replacement data. This increases the efficiency of the replacement policy implemented by replacement logic 212. It should be appreciated that the above and/or other advantages and benefits can be provided by the above and other embodiments of the present invention.

While various embodiments of the present invention have been described above, it should be understood that they have been presented by way of example only, and not limitation. For example, in the above embodiments, replacement logic 212 first attempts to locate a way 222 in a cache set with invalid data in which to store the replacement data prior to searching for an available way 222 in the current segment. In an alternative embodiment, replacement logic 212 searches ways 222 in the current segment 402 rather than the entire cache set 220. As another example, the way access indicators 312 is a single bit. In alternative embodiments, way access indicators can contain any number of bits for a given application.

What is claimed is:

1. A method for storing replacement data in a multi-way associative cache, comprising at least one cache set, the method comprising:
   logically dividing the cache's cache sets into segments of at least one cache way;
   searching a cache set in accordance with a segment search sequence for a segment currently comprising a way which has not yet been accessed during a current cycle of the segment search sequence;
   searching the current segment in accordance with a way search sequence for a way which has not yet been accessed during a current way search cycle; and
   storing the replacement data in a first way which has not yet been accessed during a current cycle of the way search sequence.

2. The method of claim 1, wherein a next sequential segment of the segment search sequence is considered when a segment currently being considered to receive replacement data is determined to not contain a way which has not yet been accessed during the current segment search cycle.

3. The method of claim 1, wherein a next sequential way of the way search sequence is considered when a way currently being considered to receive replacement data is determined to have been accessed during the current way search cycle.

4. The method of claim 1, wherein sequentially searching segments of the cache set comprises:
   considering a current segment for storing replacement data until all ways in the current segment have been accessed during the current way search cycle; and
   selecting for replacement consideration a next sequential segment in the segment search sequence.

5. The method of claim 4, wherein sequentially searching segments of the cache set further comprises:
   repeating the considering and selecting for each segments in the segment search sequence.

6. The method of claim 1, wherein sequentially searching segments of the cache set further comprises:
   repeating the segment search sequence when all segments of the cache set are determined to comprise ways which have been accessed during the current segment search cycle.

7. The method of claim 4, wherein considering a current segment for storing replacement data comprises:
   searching way access indicators corresponding to ways of the current segment, wherein each way access indicator indicates whether a corresponding way has been accessed during a current way search cycle.

8. The method of claim 7, wherein selecting for replacement consideration a next sequential segment in the segment search sequence comprises:
   setting the way access indicators corresponding to the current segment's ways to a value indicating the ways have not been accessed.

9. The method of claim 1, wherein selecting an available way further comprises:
   prior to the searching of the cache set, determining whether a way of the cache set contains invalidated data; and
   storing the replacement data in the way containing the invalidated data.

10. A method for managing a multi-associative cache comprising at least one cache set, the method comprising:
    logically dividing each cache set of the cache into segments each comprising at least one cache way;
    storing replacement data in an invalidated way, if any, in the cache set, in response to a cache miss, and setting, in response to a processor accessing the replacement data, a way access indicator corresponding to the accessed way to a value indicating the way has been accessed; and
    selecting, when no invalidated way is in the cache set, a current segment of a segment search sequence for an available way; and searching the current segment in accordance with a way search sequence, for a next way not yet accessed during a current cycle of the way search sequence.

11. The method of claim 10, wherein when a way not yet accessed during a current cycle of the way search sequence is located, the method further comprises:
    storing, replacement data in the located way.

12. The method of claim 11, wherein the method further comprises:
    providing access to the way containing the replacement data.

13. The method of claim 12, wherein the method further comprises:
    setting a way access indicator corresponding to the accessed way to a value indicating the way has been accessed.

14. The method of claim 10, wherein when a way not yet accessed during a current cycle of the way search sequence is not located, the method further comprises:
    setting way access indicators corresponding to all ways in the current segment to a value indicating the ways are available.

15. The method of claim 14, wherein the method further comprises:
    selecting a next segment in the segment search sequence as the current segment; and
    repeating the segment search cycle.

16. The method of claim 10, further comprising:
    providing, in response to a cache hit, access to the way containing the requested data; and
    setting a way access indicator corresponding to the accessed way to a value indicating the way was accessed.

17. A processing environment comprising:
    a processor;
    a multi-way associative cache;
    a cache controller configured to logically divide the cache's sets into segments of at least one cache way, and comprising replacement logic that, in response to a cache miss, stores the replacement data in a way, if available, that contains invalidated data, and if not available, searches a cache set in accordance with a segment search sequence for a segment comprising a way which has not yet been accessed during a current cycle of the segment search sequence, and searches each segment in accordance with a way search sequence for a way which has not yet been accessed during a current way search cycle; and stores the replacement data in a first way which has not yet been accessed during a current cycle of the way search sequence.

18. The processing environment of claim 17, wherein the replacement logic considers a next sequential segment of the segment search sequence when a segment currently being considered to receive replacement data is determined to not contain a way which has not yet been accessed during the current segment search cycle.

19. The processing environment of claim 17, wherein the replacement logic considers a next sequential way of the way search sequence when a way currently being considered to receive replacement data is determined to have been accessed during the current way search cycle.

20. The processing environment of claim 17, wherein to sequentially search segments of the cache set, the replacement logic considers a current segment for storing replacement data and selects for replacement consideration a next sequential segment in the segment search sequence when all ways in the current segment have been accessed during the current way search cycle.

21. The processing environment of claim 20, wherein to consider a current segment for storing replacement data the replacement logic searches way access indicators corresponding to ways of the current segment, wherein each way access indicator indicates whether a corresponding way has been accessed during a current way search cycle.

22. A processing environment comprising:
means for logically dividing cache sets of a multi-way associative cache into segments of at least one cache way; and
means for storing, in response to a cache miss, replacement data in a way, if available, that contains invalidated data, and if not available, searches a cache set in accordance with a segment search sequence for a segment comprising a way which has not yet been accessed during a current cycle of the segment search sequence, and searches each segment in accordance with a way search sequence for a way which has not yet been accessed during a current way search cycle; and stores the replacement data in a first way which has not yet been accessed during a current cycle of the way search sequence.

23. The processing environment of claim 22, wherein the means for storing considers a next sequential segment of the segment search sequence when a segment currently being considered to receive replacement data is determined to not contain a way which has not yet been accessed during the current segment search cycle.

24. The processing environment of claim 22, wherein the means for storing considers a next sequential way of the way search sequence when a way currently being considered to receive replacement data is determined to have been accessed during the current way search cycle.

25. The processing environment of claim 22, wherein to sequentially search segments of the cache set, the means for storing considers a current segment for storing replacement data and selects for replacement consideration a next sequential segment in the segment search sequence when all ways in the current segment have been accessed during the current way search cycle.

26. The processing environment of claim 22, wherein to consider a current segment for storing replacement data, the means for storing searches way access indicators corresponding to ways of the current segment, wherein each way access indicator indicates whether a corresponding way has been accessed during a current way search cycle.

* * * * *

UNITED STATES PATENT AND TRADEMARK OFFICE
CERTIFICATE OF CORRECTION

PATENT NO. : 7,237,067 B2  Page 1 of 1
APPLICATION NO. : 10/829186
DATED : June 26, 2007
INVENTOR(S) : Simon C. Steely, Jr.

It is certified that error appears in the above-identified patent and that said Letters Patent is hereby corrected as shown below:

In column 4, line 58, delete "222(*l*)" and insert -- 222(1) --, therefor.

In column 4, line 58, delete "220(*l*)" and insert -- 220(1) --, therefor.

In column 4, line 60, delete "222(*l*)" and insert -- 222(1) --, therefor.

In column 4, line 60, delete "220(*l*)" and insert -- 220(1) --, therefor.

In column 5, line 3, delete "222(*l*)" and insert -- 222(1) --, therefor.

In column 9, line 17, in Claim 1, after "cache" delete ",".

In column 9, line 51, in Claim 5, delete "segments" and insert -- segment --, therefor.

In column 10, line 30, in Claim 11, after "storing" delete ",".

In column 10, line 59, in Claim 17, delete "cache;" and insert -- cache comprising at least one cache set; --, therefor.

In column 11, line 33, in Claim 22, after "dividing" insert -- at least one --.

In column 11, line 33, in Claim 22, delete "sets" and insert -- set --, therefor.

Signed and Sealed this

Nineteenth Day of August, 2008

JON W. DUDAS
*Director of the United States Patent and Trademark Office*